United States Patent
Hung et al.

(10) Patent No.: US 8,111,760 B2
(45) Date of Patent: Feb. 7, 2012

(54) DEBLOCKING FILTERS

(75) Inventors: Ching-Yu Hung, Plano, TX (US); Ngai-Man Cheung, Los Angeles, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1451 days.

(21) Appl. No.: 11/560,367

(22) Filed: Nov. 16, 2006

(65) Prior Publication Data

US 2008/0117980 A1    May 22, 2008

(51) Int. Cl.
*H04N 7/12* (2006.01)

(52) U.S. Cl. .................................................. 375/240.29
(58) Field of Classification Search .............. 375/240.29
See application file for complete search history.

(56) References Cited

U.S. PATENT DOCUMENTS

2005/0281339 A1* 12/2005 Song ........................ 375/240.24

* cited by examiner

*Primary Examiner* — Jay Patel
*Assistant Examiner* — Richard Torrente
(74) *Attorney, Agent, or Firm* — Robert D. Marshall, Jr.; W. James Brady; Frederick J. Telecky, Jr.

(57) ABSTRACT

Deblock filtering for Microsoft WMV video decoders partitions the computation so that the deblock filtering operations can be performed on horizontal or vertical stripes or in one pass on oversized macroblocks.

6 Claims, 4 Drawing Sheets

DEBLOCKING FILTERS

TECHNICAL FIELD OF THE INVENTION

The technical field of this invention is image quality improvement in video coding and decoding.

BACKGROUND OF THE INVENTION

In the MPEG-4 AVC video coding standard divides each video frame into 16×16 pixels blocks called macroblocks. This process may lead to artifacts upon decoding at the macroblock boundaries. A deblocking filter improves the visual quality of the decoded frames by reducing these artifacts. The deblocking filter is applied to all the edges of 4×4 pixels blocks in each macroblock except the edges on the boundary of a frame or a slice.

For each block, vertical edges are filtered from left to right, and then horizontal edges are filtered from top to bottom. The decoding process is repeated for all the macroblocks in a frame. A major challenge is the detection of true edges in an image. Blindly applying a low pass filter would remove most of the blocking artifacts, but would blur the image as well. Analysis of run-time profiles of decoder sub-functions shows the deblocking filter process is the most computationally intensive part of the decoder. This deblocking takes as much as one-third of computational resources of the decoder.

A deblocking filter usually processes multiple passes of an image. In embedded applications on-chip memory can hold only a portion of the image and external memory must hold the entire image. Straightforward implementation of deblocking thus incurs significant memory access time and power consumption due to external memory accesses.

FIG. 1 illustrates the role of the deblocking filter in an MPEG-4 AVC decoder. The multiple passes involved in deblocking are performed by block 105. The decoder accepts and encoded bitstream at entropy decoding block 101. Entropy decoding block 101 translates the bitstream to the frequency domain. Inverse scan and dequantization block 102 properly scales the frequency-domain information to the original scale. Higher frequency components are often scaled down to take advantage of the property that human vision is less sensitive to changes and thus tolerates larger errors in the higher frequency components. Inverse transformation block 103 converts the frequency-domain information to spatial domain image pixel values.

A block of pixels can be intra-coded, spatial-predicted or motion-compensated. For an intra-coded block, macroblock mode switch 108 produces a zero predictor to the prediction adder 104. Thus the output of inverse transform block 103 passed through unaltered to deblocking filter 105. Deblocking filter 105 performs deblocking. For a spatial-predicted block, spatial compensation block 107 retrieves an already-decoded block in the same frame from frame store 106 to construct a predictor signal. Macroblock mode switch 108 then feeds this intra-frame prediction signal to prediction adder 104. For a motion-compensated block, motion compensation block 109 retrieves an already decoded block in another frame from frame store 106 to construct a predictor to signal. Macroblock mode switch 108 feeds this motion-compensated signal to prediction adder 104. One output of deblocking filter 105 is the decoded frame. A second output to deblocking filter 105 is stored back into frame store 106 for future reference.

Because the video encoder performs spatial-to-frequency-domain transform and quantization in blocks (typically 8×8 in size), there are often abrupt transitions at block boundaries. The deblocking filter in a video encoder and decoder evens out such block boundary transitions and improves the quality of decoded video. The video encoder employs deblocking filter in the encoding flow to accurately predict the reference frames in the decoder.

Deblocking algorithms normally use complex mathematical derivations to identify and remove block artifacts. They can achieve significant improvement in subjective and objective quality, but their high computation and implementation complexity prohibits adoption directly in a real time MPEG-4 decoder.

There are a number of known deblocking algorithms which reduce the block artifacts in block DCT-based compressed images with minimal smoothing of true edges. They can be classified as: (a) regression-based algorithms; (b) wavelet-based algorithms; (c) anisotropic diffusion based algorithms; (c) weighted sum of pixels across block boundaries based algorithms; (d) iterative algorithms based on projection on convex sets (POCS); and (e) adaptive algorithms. These algorithms operate in the spatial domain. Other proposed algorithms work on the DCT transformed domain. There are three key classes of frequency domain deblocking algorithms: (a) projection on convex sets (POCS); (b) weighted sum of pixels across the block boundaries; and (c) adaptively applying different filters.

Projection on convex sets (POCS) iterative algorithms originate from early work on image restoration. A number of constraints, usually two, are imposed on an image to restore it from its corrupted version. After defining the transformations between the constraints, the algorithm starts at an arbitrary point in one of the sets, and projects iteratively among them until convergence occurs. The mean square error (MSE) is used as a metric of closeness between two consecutive projections. Convergence is reached when the MSE falls below an assigned threshold.

If the constraints are convex sets, some believe convergence is guaranteed if the intersection of the sets is non-empty. The constraint sets generally chosen are frequency band limits in both the vertical and horizontal directions (known as filtering constraint) and quantization intervals of the transform coefficients (referred to as quantization constraint). In the first step, the image is band-limited by applying a low-pass filter. The image is then transformed to obtain the transform coefficients, which are subjected to the quantization constraint. The coefficients lying outside of the quantization interval are mapped back into the interval.

For example, the coefficients can be clipped to the minimum and maximum value if outside the interval. The algorithm iterates this two-step process until convergence. The algorithm typically converges after about twenty iterations.

In weighted sum of symmetrically aligned pixels algorithms the value of each pixel is recomputed with a weighted sum of itself and the other pixel values symmetrically aligned with block boundaries. Some schemes include three other pixels, which are taken from the block above, to the left and the block above the left block. The weights are determined empirically and can either be linear or quadratic. The combined effect of these weighted sums on the pixels is an interpolation across the block boundaries.

However, there is a problem in this approach when a weighted sum of a pixel in a smooth block takes the pixels in the adjacent high-detail blocks into account. The texture details leak into the smooth region and a vague image of the high-detail blocks can be seen. This new artifact is called hosting. A scheme of grading each block according to the level of details with a grading matrix seeks to minimize this new artifact. The weights on each of the four pixels are then increased or reduced according to the grades.

The execution time in weighted sum of symmetrically aligned pixels algorithms is guaranteed, as the operations are well defined. Since the pictures must be graded before applying the filter on the pixels, this requires a four-pass scheme. This algorithm essentially performs a filtering of matrix operations in the grading process. A very high performance processor is required to implement this algorithm in real time.

In the adaptive deblocking filter algorithm, the deblocking process is separated into two stages. In the first stage, the edge is classified into different boundary strengths with pixels along the normal to the edge. In the second stage, a different filtering scheme is applied according to the strengths obtained in the first stage. In some applications the edges are classified into 3 types to which no filter, a weak 3-tap filter or a strong 5-tap filter are applied. The algorithm is adaptive because the thresholds for edge classification are based on the quantization parameters included in the relevant blocks. An edge will only be filtered if the difference between the pixel values along the normal to the edge, but not across the edge, is smaller than the threshold. For high detail blocks on the side of edges, the differences are usually larger and so strong filtering is seldom applied to preserve detail. As the threshold increases with the quantization parameters, the edges across high detail blocks will be filtered eventually because a high coding error is assumed for large quantization parameters. Since the edges are classified before processing, strong filtering can be replaced by weak filtering or even skipped. Also the filtering is not applied to every pixel but only those across the edges. A significant amount of computation can be saved through the classification. A disadvantage of this algorithm is the high complexity in control flow of the algorithm.

Table 1 summarizes the relative computation and implementation complexity of these three key classes of algorithms. POCS-based algorithms are considered the most complex algorithms because the flow complex and major operations are much more intensive than the other two.

The major operation performed in the weighted sum based algorithm and the adaptive algorithm is similar. For 4×4 pixels blocks, the major operation performed by adaptive algorithm is only about half of that by the weighted sum based algorithm. The adaptive algorithm is considered more difficult to implement because of the complexity of adaptive filtering.

TABLE 1

| Algorithm | POCS based | Weighted | Adaptive |
| --- | --- | --- | --- |
| Algorithm Flow | Iteratively projecting back and forth between two sets on whole picture | Grading blocks with grading matrix iterative on every pixel | Iteratively classify and apply filter on every block edge |
| Major Operations | Low pass filtering Discrete Cosine Transform | Weighted sum of four pixels four each pixel | 3-tap or 5-tap filter on pixels across edges |
| Relative Computation Complexity | High | Medium | Low |
| Relative Implementation Complexity | High | Low | Medium |

SUMMARY OF THE INVENTION

The present invention is a deblocking module intended for use in video decoders meeting Microsoft WMV specifications. This method partitions the computation to perform the deblocking filtering in one pass and on one small data block at a time in contrast to most current deblock filtering which require multiple image passes. This permits faster and lower-power operation due to reduced traffic to/from the external memory. The deblock filtering is performed on reconstructed pictures in both luma and chroma on 8×8, 4-wide 8-high, or 8-wide 4-high boundaries.

BRIEF DESCRIPTION OF THE DRAWINGS

These and other aspects of this invention are illustrated in the drawings, in which.

DETAILED DESCRIPTION OF PREFERRED EMBODIMENTS

The Microsoft Windows Media Video (WMV) specification requires an in-loop deblocking process for all main profile and advanced video decoders. This deblocking algorithm has several decision-making steps that are very difficult to implement on an iMX coprocessor and have a prohibitively long execute time on general purpose DSP or RISC processors. The deblock filtering of this invention carries out the WMV algorithm in hardware for good cost/performance and power/performance at some minor sacrifice of flexibility.

Figure 2:
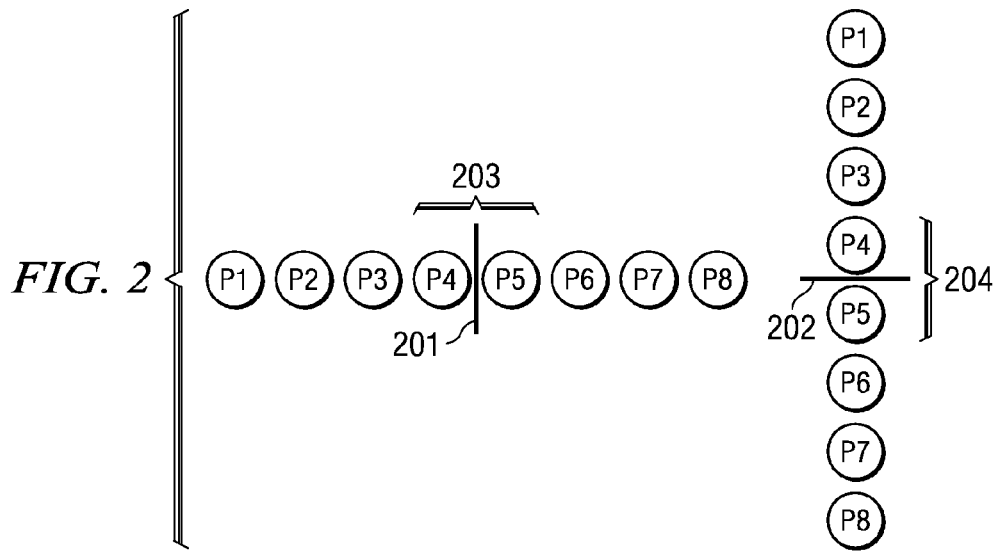
FIG. 2 illustrates the block boundaries first partitioned into 4-pixel wide segments horizontally or vertically.

FIG. 2 illustrates the deblock filtering of this invention. The deblock filtering takes 4 pixels on either side of the boundaries such as vertical boundary 201 and horizontal boundary 202 and modifies the middle two pixel pairs 203 and 204. Deblocking is performed on reconstructed pictures in both luma and chroma on 8×8, 4-wide 8-high, or 8-wide 4-high boundaries.

Figure 1:
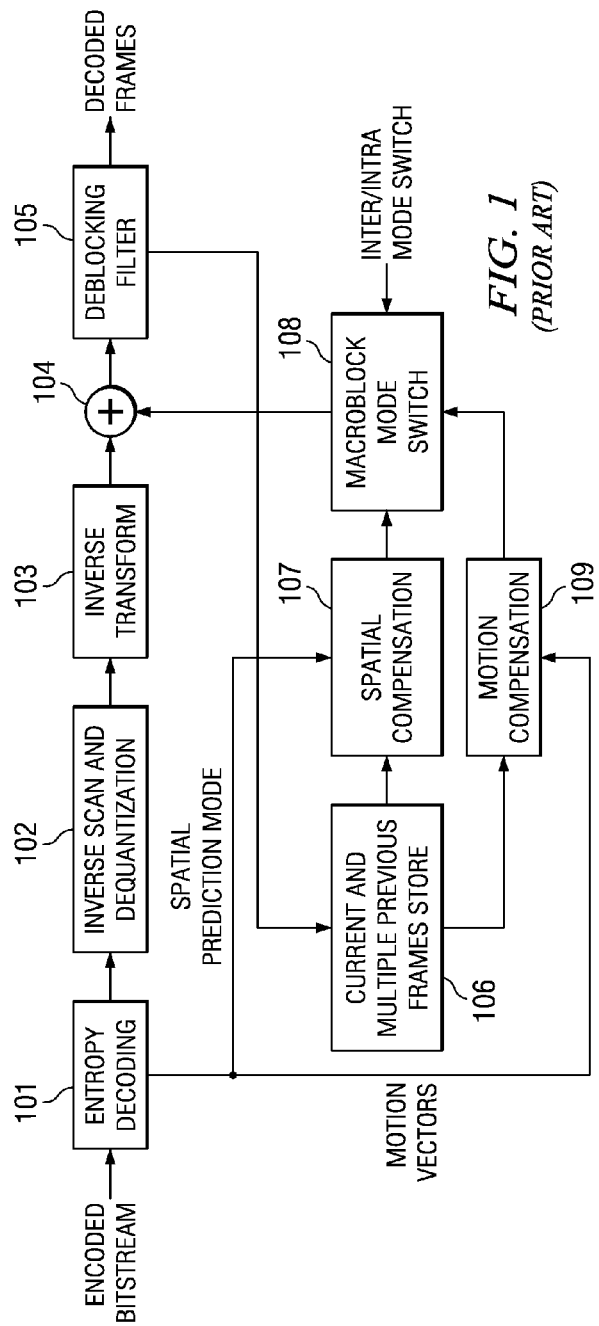
FIG. 1 illustrates the block diagram of a conventional MPEG-4 decoder (Prior Art)
Figure 3:
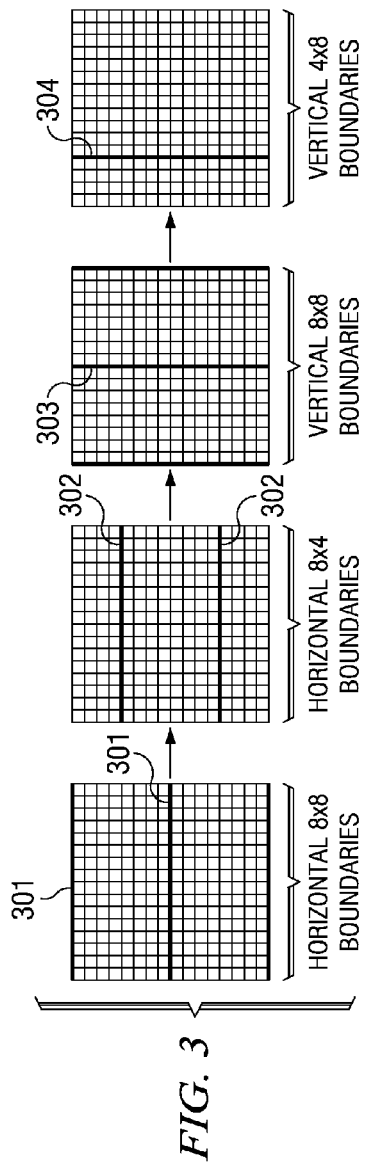
FIG. 3 illustrates the designation order of pixels used to deblock a vertical block/subblock boundary in one 16×16 macroblock.

FIG. 3 illustrates the order of processing on the boundaries:
1. Horizontally on 8×8 boundaries for the whole picture at 301;
2. Horizontally on 8×4 boundaries for the whole picture at 302;
3. Vertically on 8×8 boundaries for the whole picture at 303; and
4. Vertically on 4×8 boundaries for the whole picture at 304.

The following criteria determine whether a particular boundary segment is deblock filtered:

A. Intra-coded blocks are always coded as 8×8 DCT and only deblock filtered on 8×8 boundaries;

B. Inter-coded blocks can use 8×4 or 4×8 size DCT and deblock filtered on the subblock boundaries;

C. Deblock filtering is not performed where motion vectors are the same across the boundary and both subblocks or blocks have all-zero DCT coefficients; and D. Boundaries are not deblock filtered at picture borders.

Figure 4:
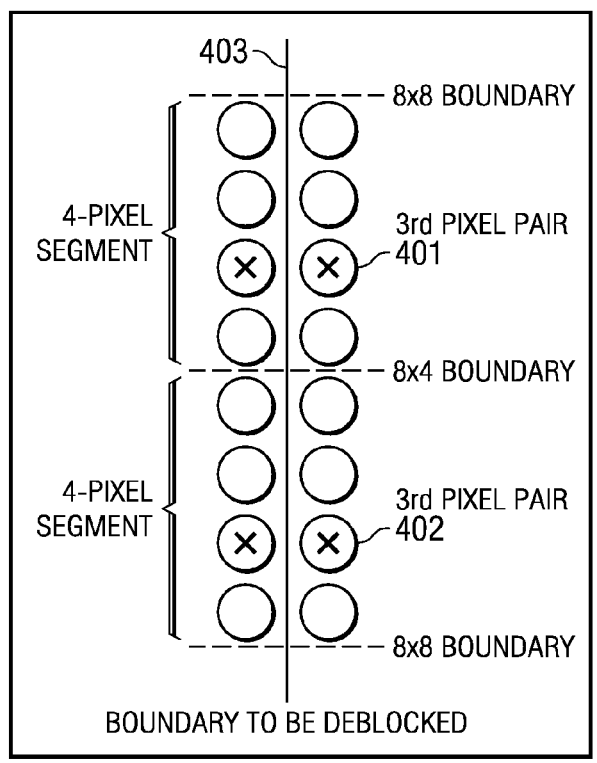
FIG. 4 illustrates 4-pixel segments along a vertical block/subblock boundary.

FIG. 4 illustrates boundary 403 is first partitioned into 4-pixel wide (or tall) segments. The third pair of pixels 401 and 402 on each segment is first deblock filtered. This determines whether the other three pairs are deblock filtered. For each pair of pixels to be deblock filtered, the algorithm involves four pixels on either side of the boundary and may modify the two pixels on the boundary.

The required deblock filtering may be implemented in four passes. However, since sufficient on-chip memory is generally not available to hold the entire reconstructed picture, this requires external SDRAM read/write accesses on these passes. Such SDRAM transfers can actually cost more time than computation if these transfers do not reduce the composite transfer/processing passes. It is thus highly desirable to reduce the number of passes.

Figure 5:
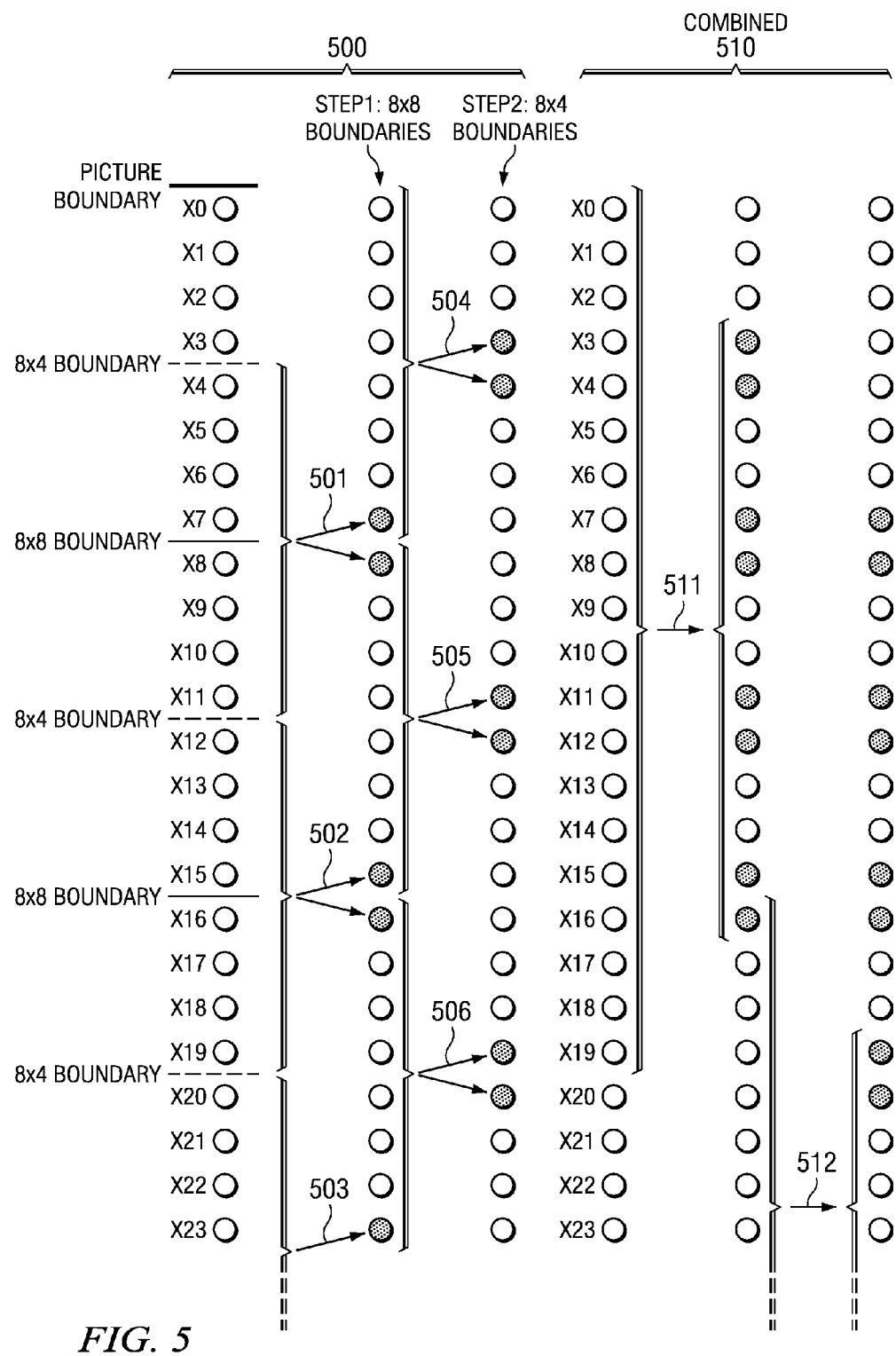
FIG. 5 illustrates the dependency of horizontal deblocking steps and combining these steps into stripe-based processing.

FIG. 5 illustrates the dependency of horizontal deblock filtering steps and combining of these steps into stripe-based processing. The first task converts from doing steps 1 and 2 sequentially on the whole picture to doing both at the same pass. This involves processing a 16-pixel tall stripe at a time through the whole picture. The left-most portion of FIG. 5 marked 500 shows pixels X0 . . . X23 going through steps 1 and 2.

Step 501: Pixels X4 . . . X11 are used to update pixels X7 and X8 in the deblock filtering.

Step 502: Pixels X12 . . . X19 are used to update pixels X15 and X16 in the deblock filtering.

Step 503: Pixels X20 . . . X27 are used to update pixels in the next adjacent group of eight pixels. This process of step 1 continues for the rest of the image.

Step 504: Pixels X0 . . . X7 with pixels X0 and X7 updated from step 1 are used to update pixels X3 and X4.

Step 505: Pixels X8 . . . X15 with pixels X8 and X15 already updated from step 1 are used to update pixels X11 and X12.

Step 506: Pixels X16 . . . X23 with pixels X16 and X23 already updated from step 1 are used to update pixels X19 and X20. This process of step 2 continues for the rest of the image.

The right-most portion of FIG. 5 marked 510 shows pixels X0 . . . X23 going through combined steps 1 and 2 according to this invention.

Step 511: Pixels X0 . . . X19 are input and pixels X3, X4, X7, X8, X11, X12, X15 and X16 are updated. This filtering takes place as prescribed in the algorithm via deblock filtering operations 501 and 502, followed by deblock filtering operations 504 and 505.

Step 512: Pixels X16 . . . X35 are input and pixels X19, X20, X23, X24, X27, X28, X31 and X32 are updated as in step 511. The process continues for the entire image.

Instead of processing the whole image in two passes, this algorithm processes in a single pass by operating on a 16-pixel-tall stripe basis, first stripe 511, then stripe 512 and so on.

The generalized expression for pixel updating in deblocking may be summarized as follows. For stripe i starting from i=0, take rows $16i$ to $16i+19$ as input, and update 8 rows ($16i+7$, $16i+8$, $16i+3$, $16i+4$, $16i+15$, $16i+16$, $16i+11$, $16i+12$).

With the technique shown in FIG. 5 applied to the horizontal deblocking steps 301 and 302 of FIG. 3 and to the vertical deblocking steps 303 and 304 of FIG. 3, the original 4-pass process is reduced to 2 passes, a horizontal stripe pass and a vertical stripe pass. This invention also merges the horizontal and vertical stripe passes into a single pass operating on a block-by-block basis.

A 16×16 pixel unit is often called a macroblock in video coding standards. It is convenient to use 16×16 blocks as the block-processing unit and call it a macroblock. This dependency partitioning technique is not restricted to the 16×16 block size.

Figure 6:
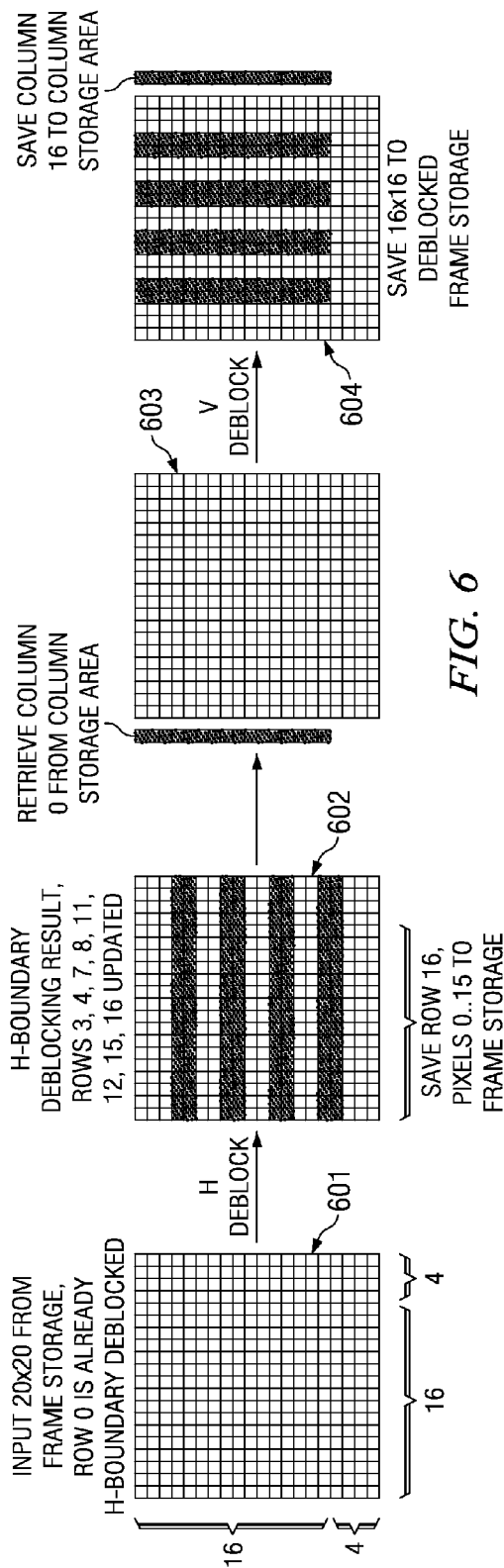
FIG. 6 illustrates the process of deblocking a 16×16 pixel macroblock.

FIG. 6 illustrates single-pass scheme of the invention. Deblock processing of each 16×16 pixel macroblock involves four steps.

Step 601: Fetch a 20×20 pixel input array from frame storage.

Step 602: Perform horizontal deblock filtering for 20-pixel-wide data, updating rows 7, 8, 15 and 16, then 3, 4, 11 and 12. Save row 16, pixels 0 . . . 15 to the frame storage. The over-processing (20×16 versus 16×16) in the horizontal direction is necessary to preserve dependency between horizontal and vertical dimensions.

Step 603: Retrieve column 0 from column storage except when column 0 is the very first column of the picture.

Step 604: Perform vertical deblock filtering for 16-pixel-tall data. Save column 16 to column storage. Save the 16×16 block to the deblocked frame storage.

The deblocked frame storage can be the same frame as the input frame storage. Note that saving the horizontally deblocked single row, row 16, does not collide with saving the final 16×16 outcome, rows 0 . . . 15 pixels 0 . . . 15. Thus, when the deblocked outcome is to be over-written the input frame, we can organize the write-back data as rows 0 . . . 16 consecutively, and write to rows 0 . . . 16 consecutively in the frame storage.

According to this invention, one macroblock of luma data and one of chroma data is processed at a time. This differs from the known order processing the whole frame of luma data, then the whole frame of chroma data. Chroma data can have a different shape, such as 4 wide by 16 tall or 8 wide by 8 tall, but is otherwise processed the same way as luma data. It is necessary to read 4 extra columns and 4 extra rows from SDRAM.

Figure 7:
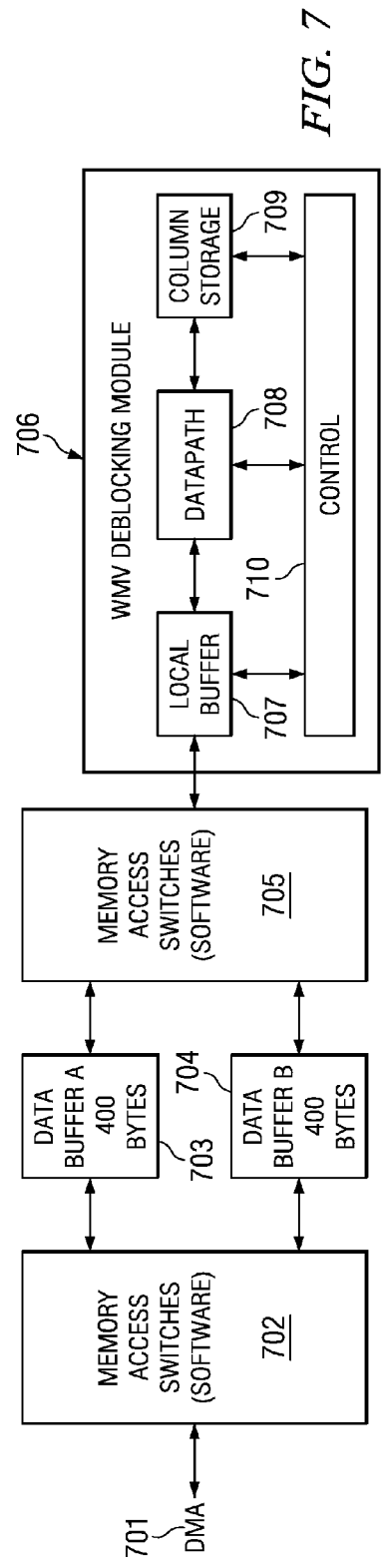
FIG. 7 illustrates the block diagram of the hardware module used to implement processing of the software algorithm of the present invention.

FIG. 7 illustrates a block diagram of a deblock filtering hardware module according to this invention. Blocks 702 and 705 are memory access switches which control ping-pong access to the two data buffers 703 and 704. This permits external SDRAM transfers to occur simultaneous with processing. Each data buffer 703 and 704 holds 20×20+16=416 pixels. Deblocking module 706 includes: local buffer 707 temporarily storing incoming or outgoing pixel data; data path ALU 708 performing all deblock filtering computations; column storage block 709 temporarily storing columns of 16 pixels; and control block 710 controlling all data block fetch, compute and store operations.

The hardware module realizes the single-pass deblock filtering method of this invention by processing one 16×16 pixel macroblock at a time following the process outlined in FIG. 6. First, a 20×20 pixel block is transferred into data buffer A 703. Then, hardware module 706 starts computation while the next 20×20 pixel block is transferred into data buffer B 704.

Hardware module 706 performs the horizontal deblock filtering process 603 iterating through steps 501, 502, 504, then 505, processing 20×16 pixel worth of deblock filtering, reading input pixels from data buffer A 703 and writing horizontally deblocked pixels back to data buffer A 703. Local buffer 707 allows combining read/write access to the data buffer A 703 for efficiency. Then, hardware module 706 writes horizontally deblocked row 16 to data buffer A 703 in a dedicated row-16 write out area.

Next, hardware module 706 retrieves the 16-pixel column data in column storage 709 and writes to data buffer A 703. Following this, hardware module 706 performs the vertical deblock filtering process 604 doing 16×16 pixel worth of deblocking, reading input pixels from data buffer A 703 and writing horizontally deblocked pixels back to data buffer A 703. Again local buffer 707 allows combining read/write access to the data buffer A 703 for efficiency.

Then, column 16 of the vertically deblocked data is saved in the column storage 709 to propagate intermediate result to the next macroblock. At this point, hardware module 706 concludes the processing for a macroblock. Memory switches 702 and 703 are toggled so that the hardware module 706 is switched to data buffer B 704, and DMA 701 can access data buffer A 703. DMA 701 writes the 16×16 deblocked outcome to the deblocked frame storage in SDRAM and the row-16 intermediate result to the source frame storage. Alternatively, when the deblocked frame is right on top of the source frame, the 16×16 block outcome and 1×16 of row-16 are written out as a 16×17 block of data.

What is claimed is:

1. A deblock filter unit comprising:
   a first pixel data buffer for temporarily storing a block of contiguous pixels of a predetermined size;
   a second pixel data buffer for temporarily storing a block of contiguous pixels of said predetermined size;
   a deblock hardware module operable to perform a deblock filter operation on pixel data;
   a first memory access switch operable to connect to a frame buffer and alternately connected to said first and second data buffers;
   a second memory access switch operable to connect to said deblock hardware module and alternately connected to said first and second data buffers;
   wherein said first and second memory access switches operate cooperatively in
      a first mode during which pixel data may be transferred between the frame memory and said first pixel buffer via said first memory access switch and pixel data may be transferred between said second pixel buffer and said deblock filter module via said second memory access switch, and
      a second mode during which pixel data may be transferred between the frame memory and said second pixel buffer via said first memory access switch and pixel data may be transferred between said first pixel buffer and said deblock filter module via said second memory access switch;
   wherein said deblock filter module is operable to
      deblock filter along 8 by 8 pixel horizontal boundaries,
      deblock filter along 8 by 4 pixel horizontal boundaries,
      deblock filter along 8 by 8 pixel vertical boundaries, and
      deblock filter along 4 by 8 pixel vertical boundaries; and
   wherein said deblock filter module is further operable to
      deblock filter along 8×8 pixel horizontal boundaries and said deblock filter along 8×4 pixel horizontal boundaries occur in a single 16 pixel horizontal stripe filtering operation including filtering horizontal stripes i from i=0 to an end of a frame by
         recalling rows 16$i$ to 16$i$+19 from the first or second pixel data buffer according to a current mode of said first and second memory access switches,
         updating 8 rows 16$i$+7, 16$i$+8, 16$i$+3, 16$i$+4, 16$i$+15, 16$i$+16, 16$i$+11, 16$i$+12, and
         storing said updated rows in the first or second pixel data buffer according to said current mode of said first and second memory access switches.

2. The deblock filter unit of claim 1, wherein:
   said predetermined size of said first and second pixel data buffers is 416 pixels consisting of a 20 by 20 block of contiguous pixels and 16 additional pixels.

3. A deblock filter unit comprising:
   a first pixel data buffer for temporarily storing a block of pixels of a predetermined size;
   a second pixel data buffer for temporarily storing a block of pixels of said predetermined size;
   a deblock hardware module operable to perform a deblock filter operation on pixel data;
   a first memory access switch operable to connect to a frame buffer and alternately connected to said first and second data buffers;
   a second memory access switch operable to connect to said deblock hardware module and alternately connected to said first and second data buffers;
   wherein said first and second memory access switches operate cooperatively in
      a first mode during which pixel data may be transferred between the frame memory and said first pixel buffer via said first memory access switch and pixel data may be transferred between said second pixel buffer and said deblock filter module via said second memory access switch, and
      a second mode during which pixel data may be transferred between the frame memory and said second pixel buffer via said first memory access switch and pixel data may be transferred between said first pixel buffer and said deblock filter module via said second memory access switch; and
   wherein said deblock filter module is operable to
      deblock filter along 8 by 8 pixel horizontal boundaries,
      deblock filter along 8 by 4 pixel horizontal boundaries,
      deblock filter along 8 by 8 pixel vertical boundaries, and
      deblock filter along 4 by 8 pixel vertical boundaries; and
   wherein said deblock filter module is further operable to
      deblock filter along 8×8 pixel vertical boundaries and said deblock filter along 8×4 pixel vertical boundaries occur in a single vertical stripe filtering operation including filtering vertical stripes i from i=0 to an end of a frame by
         recalling columns 16$i$ to 16$i$+19 from the first or second pixel data buffer according to a current mode of said first and second memory access switches,
         updating 8 columns 16$i$+7, 16$i$+8, 16$i$+3, 16$i$+4, 16$i$+15, 16$i$+16, 16$i$+11, 16$i$+12, and
         storing said updated columns in the first or second pixel data buffer according to said current mode of said first and second memory access switches.

4. The deblock filter unit of claim 3, wherein:
   said predetermined size of said first and second pixel data buffers is 416 pixels consisting of a 20×20 block of contiguous pixels and 16 additional pixels.

5. A deblock filter unit comprising:
   a first pixel data buffer for temporarily storing a block of pixels of a predetermined size;
   a second pixel data buffer for temporarily storing a block of pixels of said predetermined size;
   a deblock hardware module operable to perform a deblock filter operation on pixel data;
   a first memory access switch operable to connect to a frame buffer and alternately connected to said first and second data buffers;

a second memory access switch operable to connect to said deblock hardware module and alternately connected to said first and second data buffers;

wherein said first and second memory access switches operate cooperatively in
- a first mode during which pixel data may be transferred between the frame memory and said first pixel buffer via said first memory access switch and pixel data may be transferred between said second pixel buffer and said deblock filter module via said second memory access switch, and
- a second mode during which pixel data may be transferred between the frame memory and said second pixel buffer via said first memory access switch and pixel data may be transferred between said first pixel buffer and said deblock filter module via said second memory access switch; and wherein said deblock filter module is operable to
- deblock filter along 8×8 pixel horizontal boundaries,
- deblock filter along 8×4 pixel horizontal boundaries,
- deblock filter along 8×8 pixel vertical boundaries, and
- deblock filter along 4×8 pixel vertical boundaries; and wherein said deblock filter module is further operable to
- deblock filter along 8×8 pixel horizontal boundaries, deblock filter along 8×4 pixel horizontal boundaries, deblock filter along 8×8 pixel vertical boundaries and deblock filter along 8×4 pixel vertical boundaries occur in 20×20 macroblocks by
- temporarily recalling a 20×20 pixel contiguous block from the first or second pixel data buffer according to a current mode of said first and second memory access switches,
- successively horizontal deblock filtering updating first rows 7, 8, 15 and 16, then rows 3, 4, 11 and 20,
- performing vertical deblock filtering on a 16-pixel tall data, and
- saving column 16 and a 16×16 block in the first or second pixel data buffer according to said current mode of said first and second memory access switches.

6. The deblock filter unit of claim 5, wherein:
said predetermined size of said first and second pixel data buffers is 416 pixels consisting of a 20×20 block of contiguous pixels and 16 additional pixels.

* * * * *